United States Patent
Chifor et al.

(10) Patent No.: US 11,394,690 B2
(45) Date of Patent: Jul. 19, 2022

(54) END-TO-END SECURITY IN A CLOUD ADAPTIVE OVERLAY NETWORK

(71) Applicant: Lenovo Enterprise Solutions (Singapore) Pte. Ltd., Singapore (SG)

(72) Inventors: Bogdan Cosmin Chifor, Bucharest (RO); Andrei Ion Bunghez, Ploiesti (RO)

(*) Notice: Subject to any disclaimer, the term of this patent is extended or adjusted under 35 U.S.C. 154(b) by 197 days.

(21) Appl. No.: 17/039,601

(22) Filed: Sep. 30, 2020

(65) Prior Publication Data

US 2022/0103520 A1 Mar. 31, 2022

(51) Int. Cl.
*H04L 9/40* (2022.01)
*G06F 9/455* (2018.01)
*H04L 67/141* (2022.01)

(52) U.S. Cl.
CPC ...... *H04L 63/0236* (2013.01); *G06F 9/45558* (2013.01); *H04L 63/0435* (2013.01); *H04L 63/20* (2013.01); *H04L 67/141* (2013.01); *G06F 2009/45587* (2013.01)

(58) Field of Classification Search
CPC . H04L 63/0236; H04L 63/0435; H04L 63/20; H04L 67/141; G06F 9/45558; G06F 2009/45587

USPC .......................................................... 726/13
See application file for complete search history.

(56) References Cited

U.S. PATENT DOCUMENTS

| 5,155,825 | A | * | 10/1992 | Moughanni | ......... G06F 12/1027 |
| | | | | | 711/E12.072 |
| 9,641,551 | B1 | * | 5/2017 | Kariyanahalli | ......... H04L 45/64 |
| 2018/0063193 | A1 | * | 3/2018 | Chandrashekhar | ... G06F 15/177 |
| 2019/0007342 | A1 | * | 1/2019 | Wang | .................. H04L 61/2521 |
| 2019/0007364 | A1 | * | 1/2019 | Wang | .................. H04L 61/2521 |

* cited by examiner

*Primary Examiner* — Michael S McNally
(74) *Attorney, Agent, or Firm* — Jeffrey Streets

(57) ABSTRACT

A hypervisor receives an outbound network packet from a first virtual machine for secure communication with a second virtual machine, wherein the network packet includes source and destination logical network addresses, a first payload, and a network packet integrity value determined using a cryptographic session key for a current secure session between the first and second virtual machines. The hypervisor transforms the outbound network packet by replacing the logical network addresses with current physical network addresses and subsequently recalculating the network packet integrity value. The transformed outbound network packet in then transmitted onto a network for delivery to the second virtual machine.

19 Claims, 8 Drawing Sheets

END-TO-END SECURITY IN A CLOUD ADAPTIVE OVERLAY NETWORK

BACKGROUND

The present disclosure relates to a cloud adaptive overlay network.

BACKGROUND OF THE RELATED ART

In a cloud computing environment, an application may be run on a virtual machine somewhere in the computing cloud. The virtual machine provides a software operating system and has access to physical resources on a server, such as input/output bandwidth, processing power, memory capacity and data storage, to support the operation of the application. Provisioning software, such as a hypervisor, manages and allocates virtual machines among the available servers in the cloud.

One of the advantages of performing an application in a virtual machine is that the virtual machine may be migrated from one server to another to achieve an operational objective. For example, a virtual machine may be migrated to another server where the virtual machine will have greater access to physical resources. Furthermore, a virtual machine may be migrated to another server to improve a balance of workload among the available servers, or to consolidate workload onto a reduced number of servers so that one or more servers may be shutdown. A virtual machine may be migrated between servers for a wide variety of reasons.

A virtual machine may be assigned a network address to enable other devices and/or virtual machines to communication with the virtual machine over a communication network. For example, a virtual machine may be assigned an Internet Protocol (IP) address to be used in all network communications to and from the virtual machine.

BRIEF SUMMARY

Some embodiments provide a computer program product comprising a non-volatile computer readable medium and non-transitory program instructions embodied therein, the program instructions being configured to be executable by a processor to cause the processor to perform various operations. The operations may comprise receiving an outbound network packet from a first virtual machine to a second virtual machine, wherein the outbound network packet includes a source address field including a logical network address of the first virtual machine, a destination address field including a logical network address of the second virtual machine, a first payload, and a network packet integrity field including a first network packet integrity value for the outbound network packet that is determined using a cryptographic session key for a current secure session between the first and second virtual machines. The operations may further comprise receiving the cryptographic session key from the first virtual machine, and transforming the outbound network packet received from the first virtual machine to form a transformed outbound network packet by: replacing the logical network address of the first virtual machine in the source address field with a physical network address of the first virtual machine, replacing the logical network address of the second virtual machine in the destination address field with a physical network address of the second virtual machine, and replacing the first network packet integrity value in the network packet integrity field with a second network packet integrity value for the transformed outbound network packet, wherein the second network packet integrity value is determined using the cryptographic session key after replacing the logical network address of the first virtual machine in the source address field with a physical network address of the first virtual machine and replacing the logical network address of the second virtual machine in the destination address field with a physical network address of the second virtual machine. The operations may still further comprise transmitting the transformed outbound network packet onto a network for delivery to the second virtual machine.

Some embodiments provide a method comprising a first hypervisor receiving an outbound network packet from a first virtual machine to a second virtual machine, wherein the first virtual machine runs on the first hypervisor, and wherein the outbound network packet includes a source address field including a logical network address of the first virtual machine, a destination address field including a logical network address of the second virtual machine, a first payload, and a network packet integrity field including a first network packet integrity value for the outbound network packet that is determined using a cryptographic session key for a current secure session between the first and second virtual machines. The method may further comprise the first hypervisor receiving the cryptographic session key from the first virtual machine, and the first hypervisor transforming the outbound network packet received from the first virtual machine to form a transformed outbound network packet by: replacing the logical network address of the first virtual machine in the source address field with a physical network address of the first virtual machine, replacing the logical network address of the second virtual machine in the destination address field with a physical network address of the second virtual machine, and replacing the first network packet integrity value in the network packet integrity field with a second network packet integrity value for the transformed outbound network packet, wherein the second network packet integrity value is determined using the cryptographic session key after replacing the logical network address of the first virtual machine in the source address field with a physical network address of the first virtual machine and replacing the logical network address of the second virtual machine in the destination address field with a physical network address of the second virtual machine. The method may still further comprise the first hypervisor transmitting the transformed outbound network packet onto a network for delivery to the second virtual machine.

DETAILED DESCRIPTION

Figure 1:
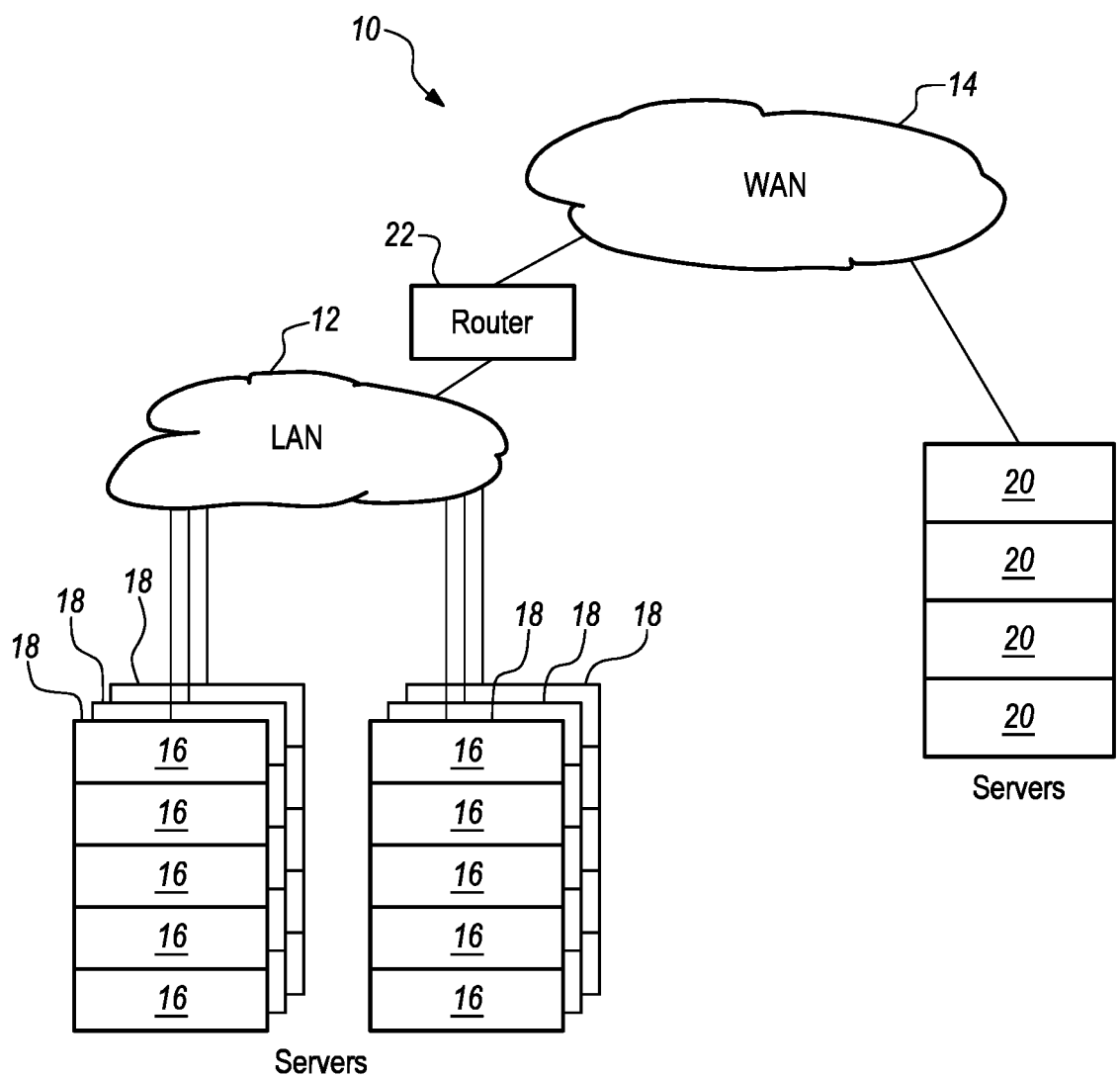
FIG. 1 is a diagram of a computer system including servers connected over various networks.

Some embodiments provide a computer program product comprising a non-volatile computer readable medium and non-transitory program instructions embodied therein, the program instructions being configured to be executable by a processor to cause the processor to perform various operations. The operations may comprise receiving an outbound network packet from a first virtual machine to a second virtual machine, wherein the outbound network packet includes a source address field including a logical network address of the first virtual machine, a destination address field including a logical network address of the second virtual machine, a first payload, and a network packet integrity field including a first network packet integrity value for the outbound network packet that was determined using a cryptographic session key for a current secure session between the first and second virtual machines. The operations may further comprise receiving the cryptographic session key from the first virtual machine, and transforming the outbound network packet received from the first virtual machine to form a transformed outbound network packet by: replacing the logical network address of the first virtual machine in the source address field with a physical network address of the first virtual machine, replacing the logical network address of the second virtual machine in the destination address field with a physical network address of the second virtual machine, and replacing the first network packet integrity value in the network packet integrity field with a second network packet integrity value for the transformed outbound network packet, wherein the second network packet integrity value is determined using the cryptographic session key after replacing the logical network address of the first virtual machine in the source address field with a physical network address of the first virtual machine and replacing the logical network address of the second virtual machine in the destination address field with a physical network address of the second virtual machine. The operations may still further comprise transmitting the transformed outbound network packet onto a network for delivery to the second virtual machine.

In some embodiments, the operations may further comprise receiving an inbound network packet over the network, wherein the inbound network packet includes a source address field including the physical network address of the second virtual machine, a destination address field including the physical network address of the first virtual machine, a second payload, and a network packet integrity field including a third network packet integrity value for the inbound network packet that was determined using the cryptographic session key for the current secure session between the first and second virtual machines. The operations may further comprise using the cryptographic session key to validate the integrity of the inbound network packet, and transforming, in response to validating the integrity of the inbound network packet, the inbound network packet to form a transformed inbound network packet by: replacing the physical network address of the second virtual machine in the source address field with the logical network address of the second virtual machine, replacing the physical network address of the first virtual machine in the destination address field with the logical network address of the first virtual machine, replacing the third network packet integrity value in the network packet integrity field with a fourth network packet integrity value for the transformed inbound network packet, wherein the fourth network packet integrity value is determined using the cryptographic session key after replacing the physical network address of the second virtual machine in the source address field with the logical network address of the second virtual machine and replacing the physical network address of the first virtual machine in the destination address field with the logical network address of the first virtual machine. The operations may still further comprise delivering the transformed inbound network packet to the first virtual machine.

In some embodiments, the first payload included in the outbound network packet may include data encrypted with the cryptographic session key for a current secure session between the first and second virtual machines. The first virtual machine may encrypt the data and include it as the first payload within the outbound network packet for the purpose of communicating the data to another virtual machine, such as the second virtual machine, which is identified in the destination address field. Similarly, the second payload included in the inbound network packet may include data encrypted with the cryptographic session key for a current secure session between the first and second virtual machines. The second virtual machine may encrypt the data and include it as the second payload within the inbound network packet for the purpose of communicating the data to another virtual machine, such as the first virtual machine, which is identified in the source address field. The data included in either the outbound network packet or the inbound network packet may be referred to as a "payload", which may include an instruction, request, reply, content or other type of message. During a secure session, the payload portion of a network packet may be the only portion of the network packet that is protected by encryption.

In some embodiments, the integrity of the network packet may be validated using the cryptographic session key. For example, the network packet integrity may be validated by the receiving hypervisor or virtual machine performing the same calculation that was used by the sending hypervisor or virtual machine to determine the network packet integrity value that is inserted into the network packet integrity field of the network packet. If the receiving hypervisor or virtual machine can calculate the same network packet integrity value, then the network packet is validated. For example, the network packet integrity value may be calculated using a cryptographic hash function that uses the cryptographic session key, such as keyed-hash message authentication code (HMAC) also known as a hash-based message authentication code. Non-limiting examples of a cryptographic hash function include Secure Hash Algorithm 2 (SHA-2) and Secure Hash Algorithm 3 (SHA-3). The network packet payload, as well as the source and destination addresses, may be combined with the cryptographic session key as input to the cryptographic hash function and the output may be a one-way computable network packet integrity value. If the receiving hypervisor or virtual machine computes a network packet integrity value that is different than the network packet integrity value in the received network packet, this means that the network packet was modified in transit. Any such modification to a network packet in transit cannot remain undetected, because any modification to the payload requires a further modification of the network packet integrity field using the cryptographic session key. Optionally, the network packet integrity value calculation and validation may be performed with IPsec using an HMAC algorithm.

Some embodiments may further comprise accessing a location table that includes a first location record associating the logical network address of the first virtual machine with the current physical network address of the first virtual machine, and a second location record associating the logical network address of the second virtual machine with the current physical network address of the second virtual machine. In fact, the location table may have a location record for each of the virtual machines running in a given virtualized environment. The location table may be used to lookup a current physical network address of a virtual machine that is associated with a logical address of the virtual machine, which operation may be performed to support transformation of an outbound network packet by replacing one or more logical network address with an associated physical network address. Conversely, the location table may be used to lookup a current logical network address of a virtual machine that is associated with a physical address of the virtual machine, which operation may be performed to support transformation of an inbound network packet by replacing one or more physical network address with an associated logical network address. The logical network address and the physical network address for each virtual machine may be a Media Access Control (MAC) address (layer 2) and/or an Internet Protocol (IP) address (layer 3).

In some embodiments, the foregoing operations may be performed by a hypervisor that supports the operation of one or more virtual machines. The hypervisor may perform the address translation and network packet integrity value recalculation on behalf of any of the virtual machine that the hypervisor supports. In many circumstances, first and second virtual machines may be run on first and second hypervisors, respectively, where the first hypervisor runs on a first server and the second hypervisor runs on a second server. As a result, a secure communication between first and second virtual machines may involve both the first and second hypervisors. For example, the first virtual machine may generate an outbound network packet and the first hypervisor may perform the outbound address translation and network packet integrity recalculation on the outbound network packet, whereas the second hypervisor may receive the inbound network packet from the first hypervisor on behalf of the second virtual machine and, after validating the packet integrity, perform the inbound address translation and network packet integrity recalculation on the inbound network packet before providing the network packet to the second virtual machine.

Some embodiments of the computer program product may include program instructions embodied on the nonvolatile computer readable medium, where the program instructions are configured to be executable by the processor to cause the processor to perform further operations according to any of the methods described herein. In some of the methods, the program instructions may be executed by one or more processors that are part of one or more servers. Optionally, the program instructions may be performed by multiple processors on one or more servers that run one or more hypervisors and/or one or more virtual machines. The methods may include any of the operations performed by a processor executing program instructions as described herein. Furthermore, some embodiments may provide a computer system that implements a virtualization environment, an Advanced Overlap Network (AON), and end-to-end security between virtual machines.

Some embodiments provide a method comprising a first hypervisor receiving an outbound network packet from a first virtual machine to a second virtual machine, wherein the first virtual machine runs on the first hypervisor, and wherein the outbound network packet includes a source address field including a logical network address of the first virtual machine, a destination address field including a logical network address of the second virtual machine, a first payload, and a network packet integrity field including a first network packet integrity value for the outbound network packet that is determined using a cryptographic session key for a current secure session between the first and second virtual machines. The method may further comprise the first hypervisor receiving the cryptographic session key from the first virtual machine, and the first hypervisor transforming the outbound network packet received from the first virtual machine to form a transformed outbound network packet by: replacing the logical network address of the first virtual machine in the source address field with a physical network address of the first virtual machine, replacing the logical network address of the second virtual machine in the destination address field with a physical network address of the second virtual machine, and replacing the first network packet integrity value in the network packet integrity field with a second network packet integrity value for the transformed outbound network packet, wherein the second network packet integrity value is determined using the cryptographic session key after replacing the logical network address of the first virtual machine in the source address field with a physical network address of the first virtual machine and replacing the logical network address of the second virtual machine in the destination address field with a physical network address of the second virtual machine. The method may still further comprise the first hypervisor transmitting the transformed outbound network packet onto a network for delivery to the second virtual machine.

In some embodiments, the method may further comprise the first hypervisor receiving an inbound network packet over the network, wherein the inbound network packet includes a source address field including the physical network address of the second virtual machine, a destination address field including the physical network address of the first virtual machine, a second payload, and a network packet integrity field including a third network packet integrity value for the inbound network packet that is determined using the cryptographic session key for the current secure session between the first and second virtual machines. The method may further comprise the first hypervisor using the cryptographic session key to validate the integrity of the inbound network packet, and the first hypervisor transforming, in response to validating the integrity of the inbound network packet, the inbound network packet to form a transformed inbound network packet by: replacing the physical network address of the second virtual machine in the source address field with the logical network address of the second virtual machine, replacing the physical network address of the first virtual machine in the destination address field with the logical network address of the first virtual machine, and replacing the third network packet integrity value in the network packet integrity field with a fourth network packet integrity value for the transformed inbound network packet, wherein the fourth network packet integrity value is determined using the cryptographic session key after replacing the physical network address of the second virtual machine in the source address field with the logical network address of the second virtual machine and replacing the physical network address of the first virtual machine in the destination address field with the logical network address of the first virtual machine. The method may still further comprise the first hypervisor delivering the transformed inbound network packet to the first virtual machine.

In some embodiments, the first virtual machine may use the cryptographic session key to validate the integrity of the transformed inbound network packet and may, in response to validating the integrity of the transformed inbound network packet, process the second payload. For example, the second payload may include data encrypted with the cryptographic session key for the current secure session between the first and second virtual machines, wherein processing the second payload includes decrypting the data in the second payload using the cryptographic session key. The payload may be further processed by the first virtual machine using the data as input to an application running on the first virtual machine.

In some embodiments, the first hypervisor may access a location table, or other data structure, that includes a first location record associating the logical network address of the first virtual machine with the current physical network address of the first virtual machine, and a second location record associating the logical network address of the second virtual machine with the current physical network address of the second virtual machine. The location table may be used to support network address translations for both outbound network packets and inbound network packets according to various embodiments. The location table may be shared among a plurality of hypervisors in the virtualization environment and may be updated in response to migration of the first virtual machine or the second virtual machine to a different physical network address. While each hypervisor may maintain their own local copy of the location table, the location table may alternatively be a single copy located where each hypervisor can access the location table as needed. Furthermore, the system may include any combination of a centralized location table and separate copies of the location table so long as they are regularly updated.

In some embodiments, the first virtual machine may negotiate the cryptographic session key with the second virtual machine for use during the cryptographic session between the first and second virtual machines. For example, the cryptographic session key may be negotiated between the first and second virtual machines using a secure network protocol selected from Internet Protocol Security and Media Access Control Security. Furthermore, the first virtual machine may generate the outbound network packet and provide the outbound network packet to the first hypervisor. In a virtualization environment, any two virtual machines may establish a security session by negotiating a cryptographic session key which is used to encrypt and authenticate parts of network packet transmitted during the security session.

In some embodiments, the method may further comprise a second hypervisor receiving the transformed outbound network packet over the network as an inbound network packet, wherein the second hypervisor runs the second virtual machine. The second virtual machine may provide the previously negotiated cryptographic session key to the second hypervisor, such that the second hypervisor may use the cryptographic session key to validate the integrity of the inbound network packet (i.e., the network packet that was outbound from the first hypervisor, but inbound as to the second hypervisor). The second hypervisor may, in response to validating the integrity of the inbound network packet, transform the inbound network packet to form a transformed inbound network packet by: replacing the physical network address of the first virtual machine in the source address field with the logical network address of the first virtual machine, replacing the physical network address of the second virtual machine in the destination address field with the logical network address of the second virtual machine, and replacing the second network packet integrity value in the network packet integrity field with a third network packet integrity value for the transformed inbound network packet, wherein the third network packet integrity value is determined using the cryptographic session key after replacing the physical network address of the first virtual machine in the source address field with the logical network address of the first virtual machine and replacing the physical network address of the second virtual machine in the destination address field with the logical network address of the second virtual machine. The method may still further comprise the second hypervisor delivering the transformed inbound network packet to the second virtual machine.

In some embodiments, the second virtual machine may use the cryptographic session key to validate the integrity of the transformed inbound network packet received from the second hypervisor, and may, in response to validating the integrity of the transformed inbound network packet, using the cryptographic session key to decrypt the payload. The second virtual machine may then process the decrypted content of the payload in any manner, such as input to an application program running on the virtual machine.

In some embodiments, the second hypervisor may access a location table that includes a first location record associating the logical network address of the first virtual machine with the current physical network address of the first virtual machine, and a second location record associating the logical network address of the second virtual machine with the current physical network address of the second virtual machine. The second hypervisor may access and use the location table in the same or different manner than previously described for the first hypervisor. However, if there are multiple location tables, each location table should have consistent location records.

In some embodiments, the first virtual machine may be a guest machine of a first host computer and the second virtual machine may be a guest machine of a second host computer. Some embodiments may be implemented in a large virtualization environment having any number of host computers, such as servers, each hosting a hypervisor that runs one or more virtual machines. Any of the virtual machines within the virtualization environment may be included in the Advanced Overlay Network (AON) and any two of the virtual machines may establish a secure communication session as described herein.

In some embodiments, the first virtual machine may install a key agreement protocol and a guest-agent on the first virtual machine, wherein the key agreement protocol provides the cryptographic session key to the guest-agent, and wherein the guest-agent provides the cryptographic session key to the first hypervisor. Optionally, the guest-agent may authenticate the first hypervisor before providing the cryptographic session key to the first hypervisor. The second virtual machine and any other virtual machine in the virtualization environment may similarly install a key agreement protocol and guest-agent in the same manner and for the same purpose as described for the first virtual machine.

In some embodiments, each hypervisor may store the cryptographic session key that it receives from a virtual machine. In particular, the first hypervisor may store the cryptographic session key, which received from the first virtual machine, in association with either a session identifier or the identities of the first and second virtual machines. Accordingly, the first hypervisor may receive a network packet, identify either the session identifier or the identities of the first and second virtual machines, then look up the associated cryptographic session key. While the first hypervisor could request that the first virtual machine provide the cryptographic session key every time they first hypervisor needs to use the cryptographic session key, doing so would add considerable latency. Therefore, the cryptographic session key is stored for immediate access by the first hypervisor. The second hypervisor may similarly store the cryptographic session that it receives from the second virtual machine. Furthermore, a hypervisor may receive and store any number of cryptographic session keys, each cryptographic session key being associated with either a session identifier or the identities of the first and second virtual machines. The cryptographic session key is preferably stored in associated with a session identifier to accommodate multiple secure sessions between any two virtual machines. The cryptographic session keys may be stored in any type of data structure, such as a table.

Some embodiments provide a computer program product and method for providing end-to-end security in an Adaptive Overlay Network (AON). An AON is a system that supports network communication between virtual machines by decoupling a logical network address from a physical address. Accordingly, a virtual machine may be associated with a particular local network address regardless of changes to an associated physical network address for the virtual machine. A virtual machine may experience a change in physical network address due to migration of the virtual machine between two physical servers. A hypervisor that provisions and manages the virtual machine may implement an AON logic module that facilitates the use of the physical network address to send and receive network packets over one or more network, while the virtual machine continues to send and receive network packets using the logical network address. The AON logic module has access to a location table that stores a location record for each virtual machine, where each location record associates the logical network address for the virtual machine with a current physical network address of the virtual machine. The AON logic module may also execute a translation between the logical address and the physical address at the hypervisor level. The AON logic module may be included as a module of the hypervisor or may be a separate module that works along side the hypervisor.

Some embodiments may provide a technological improvement in the performance of a computer since the hypervisor may perform the network address translation and network packet integrity recalculation to support communications using an end-to-end security protocol with lower latency and lower computational overhead than performing more complex mechanisms, such as network packet encapsulation. As discussed herein, the network address translation may be a logical-to-physical translation of a source address in an outbound network packet or a physical-to-logical translation of a destination address in an inbound network packet. However, embodiments perform network address translation and packet integrity field recalculation within the local hypervisor such that the network packet that the local hypervisor forwards over the network may be sent in transport mode, rather than in tunnel mode (i.e., encryption and encapsulation of one IP network packet into another IP packet with a new IP header).

FIG. 1 is a diagram of a computer system 10 including servers connected over various networks, such as a local area network (LAN) 12 and/or a wide area network (WAN) 14. A first plurality of servers 16 are connected to the local area network 12 and are illustrated as being organized in a plurality of racks 18. A second plurality of servers 20 may be connected to a separate local area network (not shown) and may be accessible to the first plurality of servers 16 via a wide area network (WAN) 14, such as the Internet. A router 22 may be used to gain access from the local area network 12 to the wide area network 14.

In a virtualized environment, the servers 16, 18 may each run a hypervisor, where each hypervisor may support the operation of one or more virtual machine. A virtual machine running on any of the servers 16, 18 may communicate with any other virtual machine running on any other of the servers 16, 18 via the network connections. Furthermore, the hypervisors running on those servers 16, 18 may implement an Advanced Overlay Network (AON) and support secure end-to-end communications between any of the virtual machines.

Figure 2:
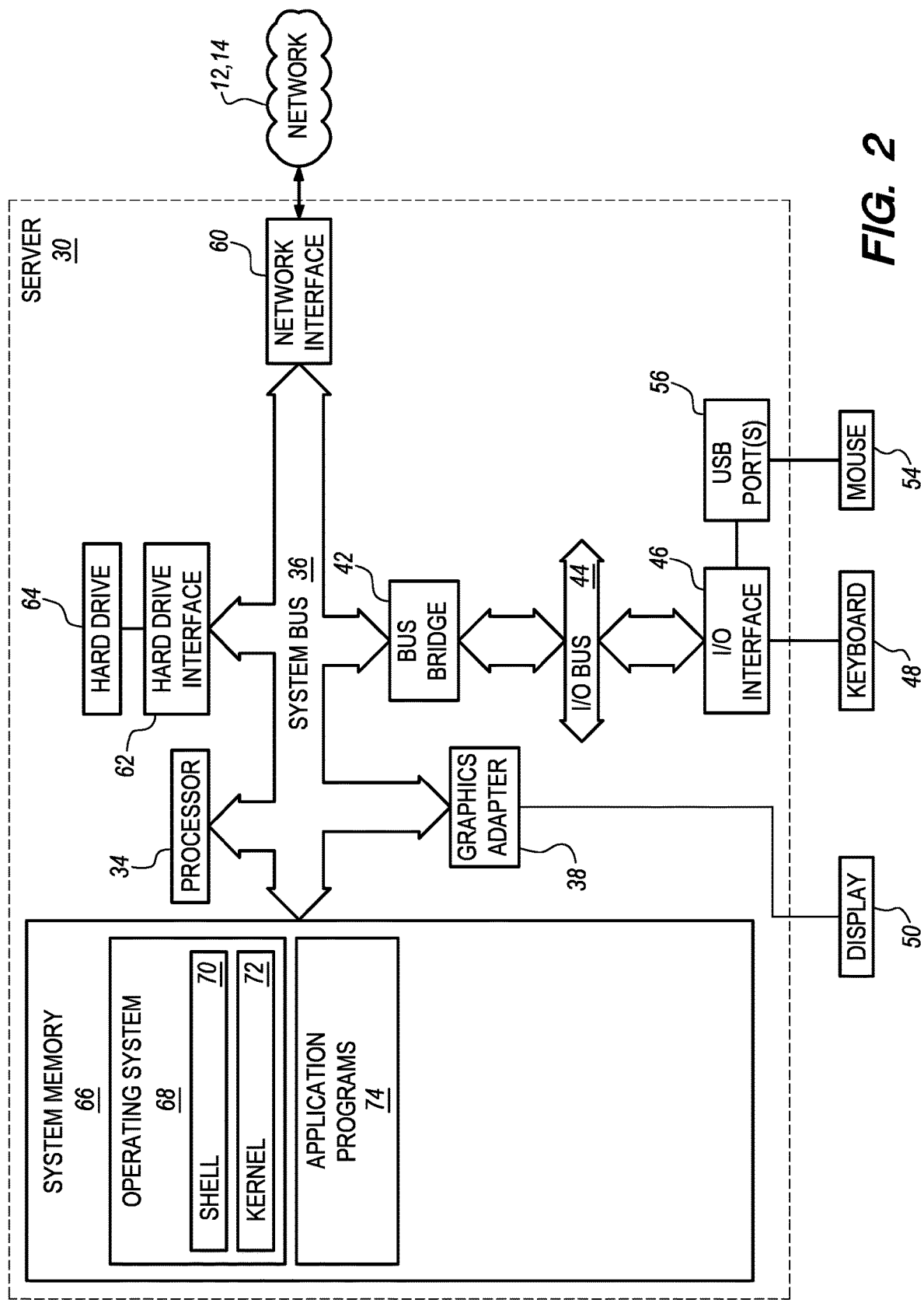
FIG. 2 is a diagram of a server.

FIG. 2 is a diagram of one non-limiting embodiment of a server 30 that may be representative of the configuration of any of the servers 16, 20 of FIG. 1. The server 30 includes a processor unit 34 that is coupled to a system bus 36. The processor unit 34 may utilize one or more processors, each of which has one or more processor cores. A graphics adapter 38, which drives/supports the display 50, is also coupled to the system bus 36. The graphics adapter 38 may, for example, include a graphics processing unit (GPU). The system bus 36 is coupled via a bus bridge 42 to an input/output (I/O) bus 44. An I/O interface 46 is coupled to the I/O bus 44. The I/O interface 46 affords communication with various I/O devices, including a keyboard 48 (such as a touch screen virtual keyboard), and a USB mouse 54 via USB port(s) 56 (or other type of pointing device, such as a trackpad). As depicted, the server 30 is able to communicate with other network devices over the network(s) 12, 14 using a network adapter or network interface controller 60. For example, the server 30 may communicate with other servers, such as the servers 16, 20 in the system 10 of FIG. 1.

A hard drive interface 62 is also coupled to the system bus 36. The hard drive interface 62 interfaces with a hard drive 64. In a preferred embodiment, the hard drive 64 communicates with system memory 66, which is also coupled to the system bus 36. System memory is defined as a lowest level of volatile memory in the computer 30. This volatile memory may include additional higher levels of volatile memory (not shown), including, but not limited to, cache memory, registers and buffers. Data that populates the system memory 66 may include an operating system (OS) 68 and application programs 74. Embodiments may include an application program that is a hypervisor application including program instructions that cause the processor 34 to perform various operations. Optionally, the hypervisor may be hosted on the operating system 68 or run on the server hardware without a separate operating system to run the hypervisor.

The hardware elements depicted in the server 30 are not intended to be exhaustive, but rather are representative. For instance, the server 30 may include non-volatile memory and the like.

The operating system 68 includes a shell 70 for providing transparent user access to resources such as application programs 74. Generally, the shell 70 is a program that provides an interpreter and an interface between the user and the operating system. More specifically, the shell 70 executes commands that are entered into a command line user interface or from a file. Thus, the shell 70, also called a command processor, is generally the highest level of the operating system software hierarchy and serves as a command interpreter. The shell may provide a system prompt, interpret commands entered by keyboard, mouse, or other user input media, and send the interpreted command(s) to the appropriate lower levels of the operating system (e.g., a kernel 72) for processing. Note that while the shell 70 may be a text-based, line-oriented user interface, embodiments may support other user interface modes, such as graphical, voice, gestural, etc.

As depicted, the operating system 68 also includes the kernel 72, which may include lower levels of functionality for the operating system 68, including providing essential services required by other parts of the operating system 68 and application programs 74. Such essential services may include memory management, process and task management, disk management, and mouse and keyboard management. As shown, the server 30 includes application programs 74 in the system memory of the server 30, including, without limitation, a hypervisor application.

Figure 3:
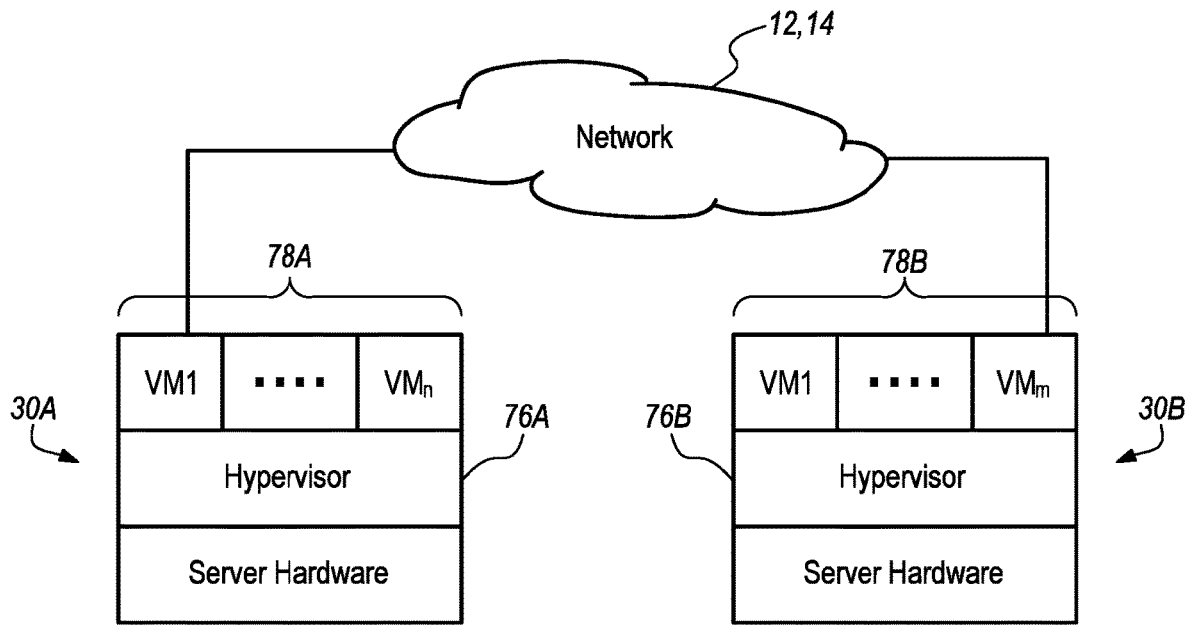
FIG. 3 is a diagram of two servers running virtual machines that are able to communicate over a network.

FIG. 3 is a diagram of two servers 30A, 30B connected by a network 12, 14 running virtual machines that are able to communicate over a network. The two servers 30A, 30B may both be in the same or different local area networks and/or accessible only through the wide area network without limitation regarding the architecture of the network. The servers 30A, 30B each run a hypervisor 76A, 78B, respectively. Each hypervisor 76A, 76B may support the operation of one or more virtual machine 78A, 78B, respectively. As shown, the first hypervisor 76A may run a plurality of virtual machines (i.e., VM1 through VMn) and the second hypervisor 76B may run a plurality of virtual machines (i.e., VM1 through VMm), wherein m and n represent the total number of virtual machine running on a hypervisor at a given time. Furthermore, any of the virtual machines 78A running on the first hypervisor 76A may send and/or receive network packets with any of the virtual machines 78B running on the second hypervisor 76B. Of course, any two virtual machines running on the hypervisor may also communicate, but it is not necessary to perform any network address translations to accommodate such communication.

Figure 4:
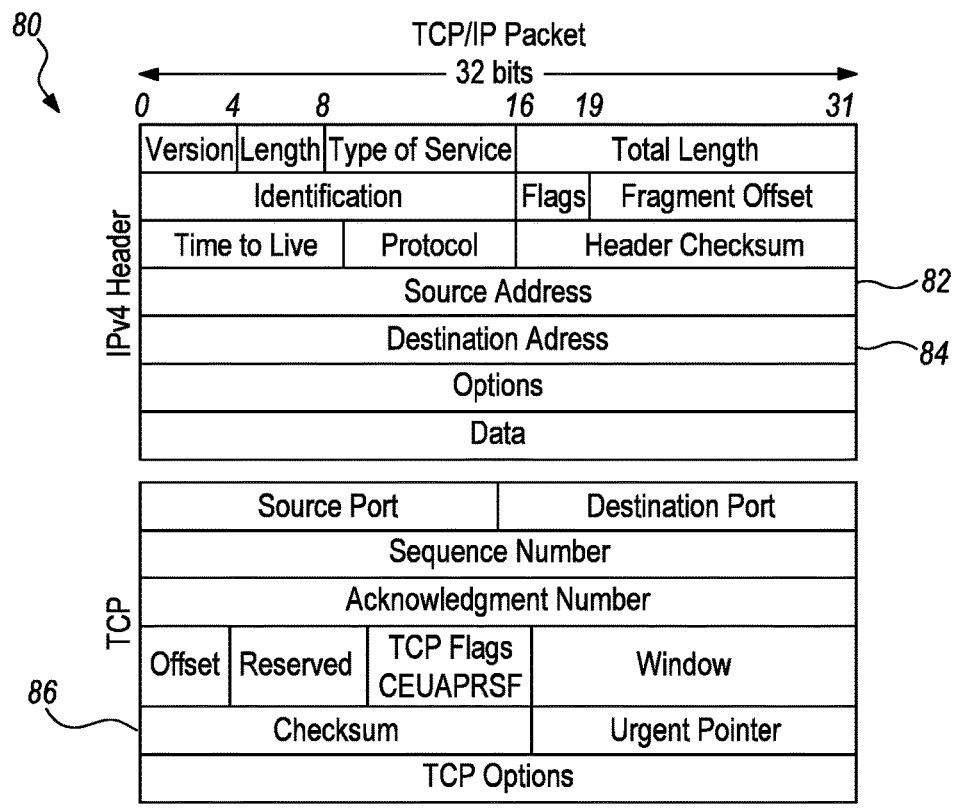
FIG. 4 is a diagram illustrating the content of a hypothetical TCP/IP packet.

FIG. 4 is a diagram illustrating the content of a hypothetical TCP/IP packet 80, which is a non-limiting example of a network packet. Embodiments described herein do not require any changes to a given network packet protocol. Rather, embodiments may include translation of the values included in various fields of a given network packet protocol. For example, a first virtual machine may generate the network packet 80 and populate the source address field 82 with the first virtual machine's logical network address. If the first virtual machine is sending the network packet 80 to a second virtual machine, then the first virtual machine may populate the destination address field 84 with the logical network address of the second virtual machine.

According to various embodiments, a hypervisor may receive the network packet 80 from the first virtual machine and translate both the logical network address stored in the source address field 82 and the logical network address stored in the destination address field 84. The translation replaces the logical network address of the first virtual machine stored in the source address field 82 with a physical network address where the first virtual machine is currently located (i.e., a current physical network address) and replaces the logical network address of the second virtual machine stored in the destination address field 84 with a physical network address where the second virtual machine is currently located (i.e., a current physical network address).

After translating, transforming or replacing these network addresses, the hypervisor may also recalculate a network integrity value stored in a network integrity field 86 of the network packet 80. While the network integrity field 86 may be a checksum, other types of network integrity values may be stored in the network integrity field 86. To support this recalculation, the hypervisor may receive a cryptographic session key that is being used by the first and second virtual machines to secure their communication session. The cryptographic session key may have been previously negotiated by the first and second virtual machines in accordance with a network security protocol, such IPsec or MACsec.

Figures 5, 6A, 6B:
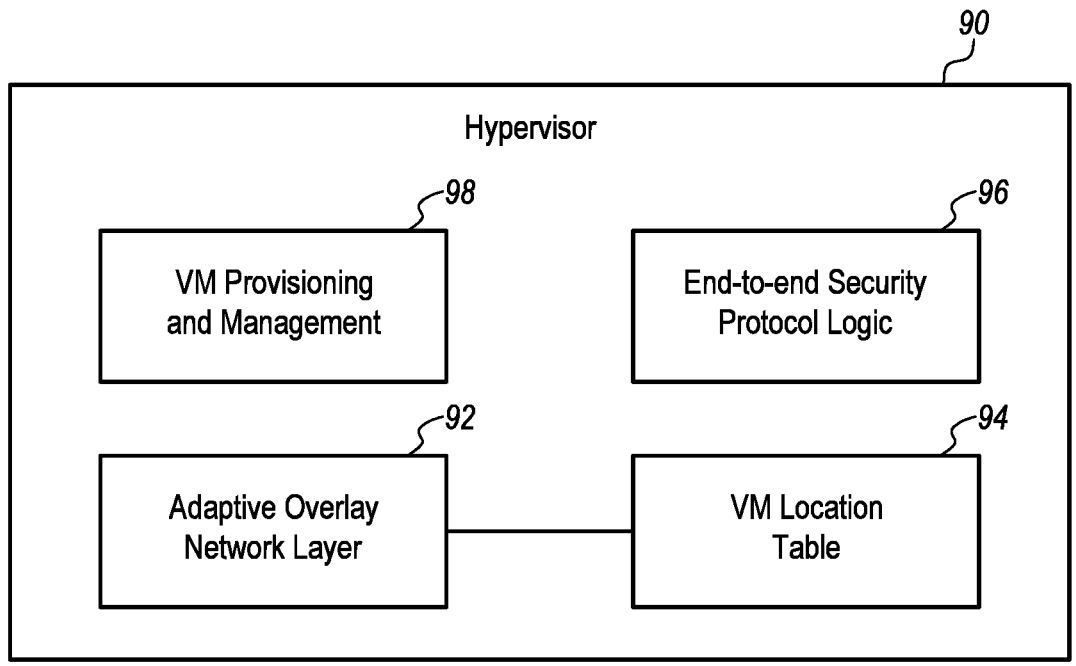
FIG. 5 is a diagram of a hypervisor including an adaptive overlay network (AON) layer and a virtual machine (VM) location table.
FIGS. 6A and 6B are illustrations of a location table having location records for first and second virtual machines, each location record having a logical network address and a physical address before and after migration of the second virtual machine from a second physical address (P2) to a third physical address (P3).

FIG. 5 is a diagram of a hypervisor 90 including an adaptive overlay network (AON) layer module 92 and a virtual machine (VM) location table 94. The AON layer module 92 may perform network address translations using location records stored in the location table 94 for various virtual machines. The hypervisor 90 also include end-to-end security protocol logic or module 96, which may handle cryptographic session keys received from the virtual machines, perform recalculation of network packet integrity values, and perform validation or verification of network packet integrity for inbound network packets. Still further, the hypervisor 90 may include a virtual machine provisioning and management module 98 for installing new virtual machines and managing each of the virtual machines that run on the hypervisor. The module 98 may also cause the virtual machines to install a key agreement protocol and a guest-agent as described in reference to FIG. 7. These modules and other modules may be used to implement various functions attributed to the hypervisor by the embodiments described herein.

FIGS. 6A and 6B are illustrations of a location table. The location table 94A in FIG. 6A has a location record for each of the first and second virtual machines. If the AON includes additional virtual machines, then the location table may include a similar location record for each of the additional virtual machines. As shown, each location record (illustrated as a row of the table) has a logical network address (first column of the table) and a physical network address (second column of the table). For a first virtual machine VM1, a location record shows that a logical network address L1, such as a logical IP address, of VM1 is associated with a current physical network address P1, such as a physical IP address, of VM1. Similarly for a second virtual machine VM2, a location record shows that a logical network address L2, such as a logical IP address, of VM2 is associated with a current physical network address P2, such as a physical IP address, of VM2. The location table 94A may be used by a hypervisor to translate the source and destination network addresses of an inbound network packet by replacing the physical network addresses used for transmission over a network with the associated logical network addresses used by the virtual machines. The location table 94A may also be used by the hypervisor to translate the source and destination network addresses of an outbound network packet by replacing the logical network addresses used by the virtual machines with the associated physical network addresses used for transmission over a network.

In the AON, every virtual machine is associated with two addresses, including a permanent logical IP address that uniquely and permanently identifies the virtual machine and a curry physical network address that identifies where the virtual machine is currently located. These two addresses are associated in a location record of the location table. The location table is made accessible across the entire AON, including each hypervisor, and is updated regularly to maintain an accurate association of the logical network address and the current physical network address for each virtual machine in the AON as virtual machines may be migrated from one physical location (i.e., a pre-migration physical IP address) to another physical location (i.e., a post-migration physical IP address) over time. Furthermore, the location table should be updated with a new location record for any newly provisioned virtual machine within the AON, where the new location record will include both the logical network address assigned to the new virtual machine and the current physical network address where the new virtual machine is being provisioned.

FIG. 6B is an illustrate of the location table 94B, which is an updated version of the location table 94A following migration of the second virtual machine VM2 from the physical network address P2 to a current physical network address P3. The logical network address of the second virtual machine VM2 keep the same logical network address L2 despite the change in the physical network address from P2 to P3. Accordingly, a first hypervisor running the first virtual machine VM1 may handle an outbound network packet being second from VM1 to VM2 and replace the logical network addresses L1 and L2 in the source and destination fields with the physical network addresses P1 and P3. Since the first hypervisor has access to the updated location table 94B, the destination field will be translated from the logical network address L2 to the current physical network address P3 of the second virtual machine VM2. However, the first and second virtual machines VM1 and VM2 may communicate using logical network addresses that do not change as a result of migration of one or both of the virtual machines.

Figure 7:
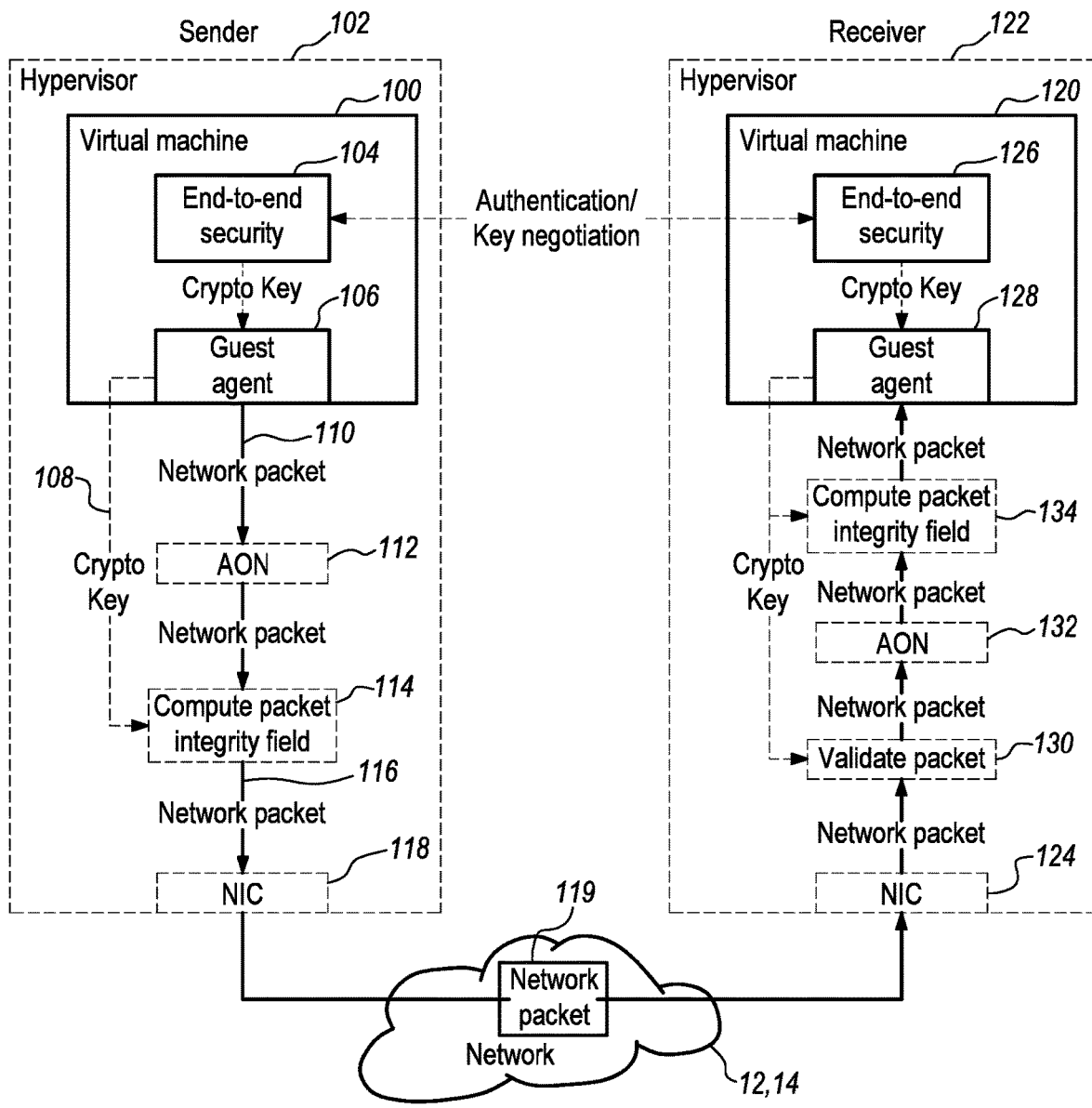
FIG. 7 is a diagram of a first virtual machine sending a network packet over a network to a second virtual machine.

FIG. 7 is a diagram of a first virtual machine sending a network packet over a network to a second virtual machine. The first virtual machine 100 runs on a first hypervisor 102 and the second virtual machine 120 runs on a second hypervisor 122. The first virtual machine 100 and the first hypervisor 102 work together to provide one end of an end-to-end security protocol that is compatible with an Adaptive Overlay Network (AON) despite the network address translations that are performed by the AON. In reference to FIG. 7, the first virtual machine 100 and the first hypervisor 102 may be described as being the "sending" virtual machine and the "sending" hypervisor, respectively, but it should be recognized that the first virtual machine and first hypervisor may also be a "receiving" virtual machine and a "receiving" hypervisor with respect to a separate network packet generated by another virtual machine and identifying the network address of the first virtual machine as the destination of the network packet. However, in reference to FIG. 7, the second virtual machine 120 and the second hypervisor 122 may be described as the "receiving" virtual machine and the "receiving" hypervisor, respectively, of the network packet sent from the first virtual machine, but it should be recognized that the second virtual machine 120 and the second hypervisor 122 may also be a "sending" virtual machine and a "sending" hypervisor with respect to a separate network packet (not shown) generated by the second virtual machine 120 and identifying the network address of another virtual machine as the destination of the network packet. As a result, the functions attributed to the first virtual machine 100 and first hypervisor 102 may also be performed by the second virtual machine 120 and second hypervisor 122, and the functions attributed to the second virtual machine 120 and second hypervisor 122 may also be performed by the first virtual machine 100 and first hypervisor 102. Therefore, both the first and second hypervisors may handle inbound network packets as well as outbound network packets over time to support various communications to and from the one or more virtual machines running on the particular hypervisor.

The first virtual machine 100 includes end-to-end security logic 104 that allows the first virtual machine to carry out one end of a secure network communication. For example, the end-to-end security logic 104 may implement a secure network protocol, such as IPsec or MACsec. The end-to-end security protocol may provide network packet integrity (authentication) and/or network packet confidentiality (encryption). For example, the end-to-end security protocol may provide integrity for the entire network packet and/or provide security for the packet payload. The operation of the end-to-end security logic 104 includes the negotiation of a cryptographic session key with the destination virtual machine, such as the second virtual machine 120 in this illustration.

The operation of the end-to-end security logic 104 further includes the sharing of the negotiated cryptographic session key with a guest-agent 106 installed on the virtual machine. For example, the virtual machine 100 may install a custom key agreement protocol which will transmit the cryptographic session key (i.e., encryption key) and cryptographic session identifier to the guest-agent in response to negotiating the encryption key and establishing a cryptographic session identifier with the other virtual machine participating in the end-to-end secure communication session. Accordingly, after the first and second virtual machines 100, 120 have established a security session by negotiating the cryptographic session key which is used to encrypt and authenticate parts of network packet transmitted during the security session, the custom key agreement protocol may automatically provide the cryptographic session key and cryptographic session identifier to the guest-agent.

The operation of the guest-agent 106 includes sharing of the negotiated cryptographic session key and the session identifier with the first hypervisor 102 (see element 108). The cryptographic session key and session identifier may be automatically shared with the first hypervisor or may be provided upon request received from the first hypervisor. For example, the hypervisor may request the cryptographic session key (and session identifier) in response to receiving an outbound network packet including the logical network address of the first virtual machine 100 or in response to receiving an inbound network packet including the physical network address of the first virtual machine in the destination field.

The first virtual machine 100 may run an application program (not shown) that initiates communication with another virtual machine, such as the second virtual machine 120. Accordingly, the first virtual machine 100 will generate a network packet that includes the logical network address of the first virtual machine in the source address field, the logical network address of the second virtual machine in the destination address field, a payload, and a network packet integrity value in the network packet integrity field. Optionally, the first virtual machine 100 may encrypt some or all of the payload using the cryptographic session key. The first virtual machine 100 may then provide the generated network packet to the first hypervisor 102 (see element 110).

After receiving the network packet from the first virtual machine 100, the first hypervisor 102 may transform the network packet by translating the logical network addresses in the source and destination fields to physical network addresses to implement the Advanced Overlay Network (AON). For example, an AON logic module 112 of the first hypervisor 102 may receive the network packet from the first virtual machine, and may lookup a location record stored in the location table that is associated with the first virtual machine 100 by using the first virtual machine's logical network address (i.e., the logical network address in the source address field) as an index. Once the location record for the first virtual machine 100 is identified, the current physical network address of the first virtual machine is read from the location record. Prior to transmission of the network packet over the network, the source address designated in the network packet is modified by replacing the logical network address of the first virtual machine with the current physical network address of the first virtual machine as read from the location record. Similarly, the logical network address of the second (destination) virtual machine is replaced with the current physical network address for the second virtual machine as identified in a location record of the location table.

If the first hypervisor were to transmit the network packet to the second (destination) virtual machine after merely replacing the first virtual machine's logical network address for the associated current physical network address and replacing the second virtual machine's logical network address for the associated current physical network address, the packet integrity would be compromised and the functionality of any end-to-end security protocol would be broken. Rather, the hypervisor may use the cryptographic session key received from the guest-agent to compute a valid network packet integrity value (see element 114), as required by the end-to-end security protocol (MACSec/IPSec), after executing the AON translation of the source and destination logical network addresses. For example, the packet integrity field may be a cryptographic checksum of the content of the network packet, perhaps computed with an algorithm like HMAC-X (where X indicates a hash algorithm such as SHA-256). The recalculated or updated network packet integrity value is then inserted into the network packet integrity field of the network packet. The first hypervisor 102 then provides the network packet (see element 116), which is outbound relative to the first hypervisor 102 and first virtual machine 100) to the network interface controller (NIC) 118 that is a hardware component of the first server (not shown). Accordingly, the NIC 118 transmits the network packet 119 onto the network 12, 14 for delivery to the physical network address identified in the destination address field.

The network packet 119, which is inbound relative to the second hypervisor 122 and second virtual machine 120, is delivered to a network interface controller (NIC) 124 that is a hardware component of a second server (not shown) that runs the second hypervisor 112. The network packet 119 is then provided to the second hypervisor 122 to validate the network packet integrity of the network packet, perform the AON network address translation, and compute an updated network packet integrity value, before providing the inbound network packet to the second virtual machine 120.

The second hypervisor 122 may perform a validation or integrity check on an inbound network packet and may discard any network packets that fail the validation check. One circumstance that may cause a network packet to fail an integrity check is that an attacker has modified one or more fields of the network packet, such as the source address or destination address. In this example, the end-to-end security logic 126 of the second virtual machine 120 provides the cryptographic session key, which was previously negotiated with the first virtual machine 100, and the associated session identifier to the guest-agent 128. The guest-agent 128 may then provide the cryptographic session key and session identifier to the second hypervisor 122. Accordingly, the second hypervisor 122 may store and use the cryptographic session key and session identifier to perform the integrity check (see element 130) on the inbound network packet. For example, the second hypervisor 122 may perform the same network packet integrity calculation as the first hypervisor 102 performed as element 114. Initially, the second hypervisor may obtain the session identifier and/or the source and destination addresses in order to select the cryptographic session key that is being used for the session. If the network packet integrity value calculated by the second hypervisor is the same as the network packet integrity value in the network packet integrity field of the network packet received by the second hypervisor, then the integrity of the network packet is said to be "validated." If the second hypervisor 122 cannot validate the integrity of the network packet (i.e., the network packet integrity value calculated by the second hypervisor is not the same as the network packet integrity value in the network packet), then the network packet may be discarded and may not be further processed by the second hypervisor 122 and may not passed along to the second virtual machine 120. However, if the second hypervisor 122 successfully validates the integrity of the network packet, then the network packet may be further processed by the second hypervisor 122 and ultimately passed along to the second virtual machine 120.

If the second hypervisor 122 has validated the integrity of the network packet at element 130, then the AON logic module 132 of the second hypervisor 122 may perform a network address translation. Accordingly, the AON logic module 132 may lookup a location record stored in the location table that is associated with the second virtual machine, by using the physical network address (i.e., the destination address) as an index. Once the location record for the second virtual machine is identified, the logical network address of the second virtual machine 120 is read from the location record. Prior to delivery of the network packet to the destination virtual machine, the destination address designated in the network packet is modified by replacing the current physical network address of the second virtual machine with the logical network address of the second virtual machine that was read from the location record. Similarly, the source address designated in the network packet is modified by replacing the current physical network address of the first virtual machine with the logical network address of the first virtual machine, wherein the logical network address and current physical network address of the first virtual machine are associated by virtue of being stored within the same location record of the location table. Importantly, the location table used by the second hypervisor, as well as every hypervisor in the AON, must be updated to reflect the current physical addresses of each virtual machine.

However, if the network packet were to be delivered to the destination virtual machine after merely replacing the current physical network addresses of the first and second (source and destination) virtual machine with the logical network addresses of the first and second virtual machines, then the mere address translation performed by the hypervisor would be the equivalent of a packet tampering action, such as a "man-in-the-middle" attack, and the packet integrity would be compromised such that the functionality of any end-to-end security protocol would be broken. More specifically, the second virtual machine would be unable to validate the integrity of the network packet. Therefore, the second hypervisor may then use the cryptographic session key (associated with the session identifier and/or source and destination network addresses) to compute a valid packet integrity field (see element 134), as required by the end-to-end security protocol (IPsec/MACSec), after executing the AON translation of the network addresses within the inbound network packet. In this manner, the hypervisor may perform network address translation as required to implement the AON, yet may send and receive network packets with an integrity field value that accurately represents the translated network address.

In some embodiments, the second hypervisor 122 may include program instructions forming a module referred to as an "AON engine" (not shown). The AON engine may perform the function of the network address translation (element 132), as well as the function of the subsequent computation of a new packet integrity value and replacement of the value into the network packet integrity field of the network packet (element 134). Accordingly, the guest-agent 128 installed on the second virtual machine 120 may communicate the cryptographic session key and cryptographic session identifier to the AON engine. In some embodiments, the AON engine may also validate the network packet integrity, although the network packet integrity may be validated in a separate module of the second hypervisor 122. It should be recognized that the first hypervisor 102 may similarly combine the network address translation and network packet integrity calculation of elements 112, 114 into an AON engine (not shown).

After the second hypervisor 122 has transformed the validated network packet to replace the physical network addresses with the associated logical network addresses and to include a recalculated network packet integrity value, then the transformed network packet may be provided to the second virtual machine 120. The second virtual machine 120 may then validate the packet integrity using the cryptographic session key and may process the payload. For example, if the first virtual machine 100 encrypted the payload with the negotiated cryptographic session key, then the second virtual machine 120 may decrypt the payload with the negotiated cryptographic session key. The decrypted payload may include instructions, content or other data that may be used by the application running on the second virtual machine.

During an established security session between two virtual machines, either of the virtual machines may initiate the generation and transmission of one or more network packet to the other virtual machine. In fact, the two virtual machines may transmit and/or receive any number of network packets during a security session. With respect to any individual network packet, the sending virtual machine will generate the network packet, where the network packet may include a source address, a destination address, some amount of data, and a network packet integrity field. The network packet may also include various other fields consistent with a network packet protocol, such as IPsec or MACsec. The source address is the network address that the sending virtual machine identifies or recognizes as being its own network address. In the AON, a sending virtual machine may identify a logical network address as being its network address. Accordingly, the sending virtual machine may include its logical network address in the source address field of the network packet. The destination address is the network address that the sending virtual machine identifies with the destination virtual machine (i.e., the receiving virtual machine) to which the sending virtual machine is sending the network packet.

The data included in the network packet may be referred to as a "payload", which may be an instruction, request, reply, content or other type of message. In a security session, the payload portion of the network packet may be the only portion of the network packet that is protected by encryption. The packet integrity field is provided to enable the receiving virtual machine to determine whether the content of the network packet has been changed since transmission from the sending virtual machine. For example, the sending virtual machine may use a checksum or hash function algorithm to calculate a checksum or hash function value based on the other digital values in the other fields of the network packet. Therefore, if any portion of the network packet is changed, the receiving virtual machine will obtain a different checksum or hash function value when using the same checksum or hash function algorithm on the received network packet. If the receiving virtual machine calculates a different checksum or hash function value than the checksum or hash function value included in the network packet, then the receiving virtual machine is unable to validate the integrity of the network packet. In one option, if the receiving virtual machine cannot validate the integrity of a network packet, then the receiving virtual machine may discard or otherwise ignore a network packet.

In some embodiments, the receiving virtual machine may send an acknowledgement of successful receipt to the sending virtual machine such that the sending virtual machine does not resend the network packet. Optionally, the sending virtual machine may automatically resend any network packet for which an acknowledgement receipt is not received after a period of time.

Figure 8:
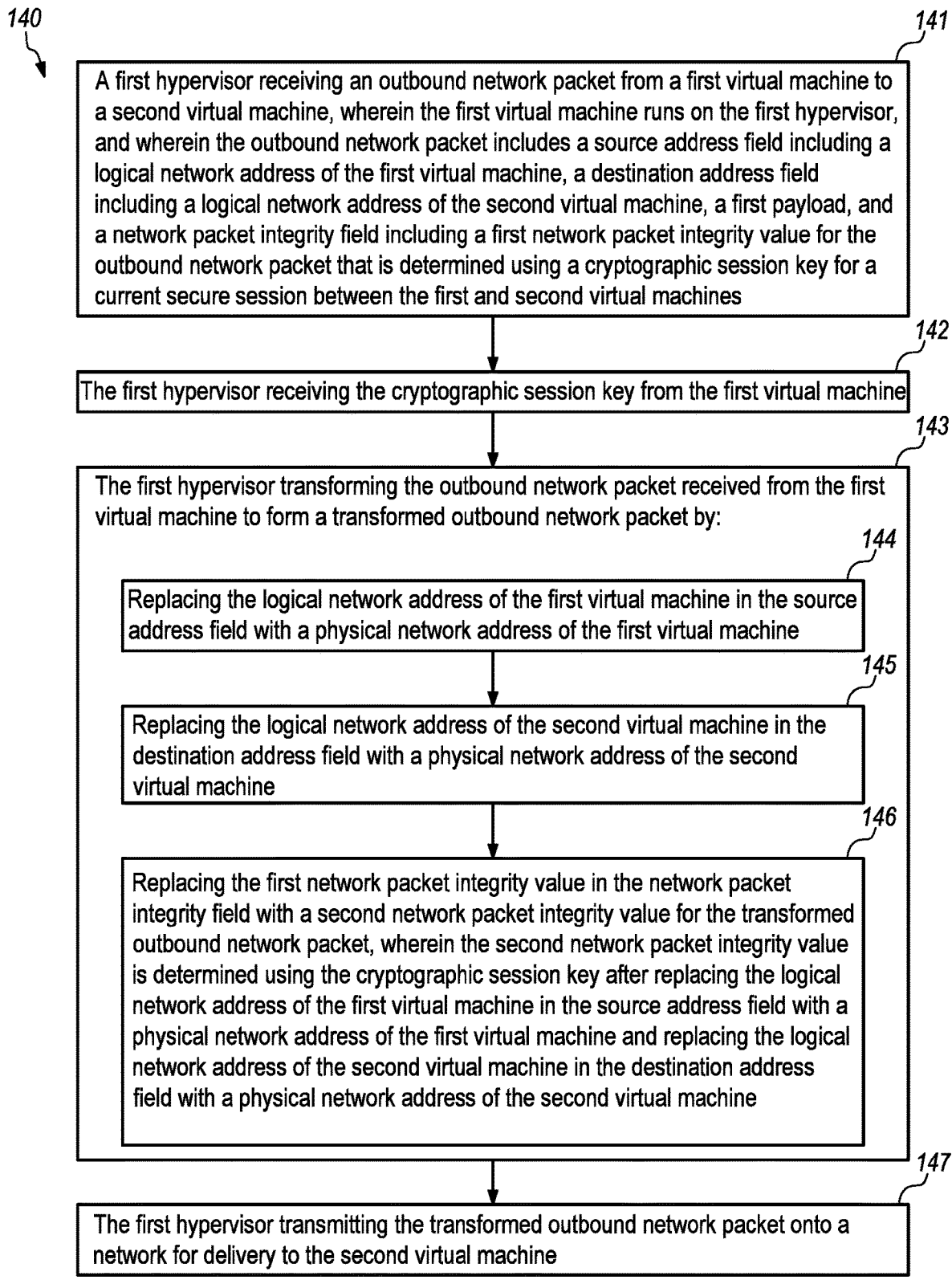
FIG. 8 is a flowchart of operations performed by a hypervisor that is hosting a virtual machine that is sending a network packet.

FIG. 8 is a flowchart of method 140 including steps or operations performed by a hypervisor that is hosting a virtual machine that is sending a network packet. Step 141 includes a first hypervisor receiving an outbound network packet from a first virtual machine to a second virtual machine, wherein the first virtual machine runs on the first hypervisor, and wherein the outbound network packet includes a source address field including a logical network address of the first virtual machine, a destination address field including a logical network address of the second virtual machine, a first payload, and a network packet integrity field including a first network packet integrity value for the outbound network packet that is determined using a cryptographic session key for a current secure session between the first and second virtual machines. Step 142 includes the first hypervisor receiving the cryptographic session key from the first virtual machine.

Step 143 includes the first hypervisor transforming the outbound network packet received from the first virtual machine to form a transformed outbound network packet by means of steps 144, 145 and 146. Step 144 includes replacing the logical network address of the first virtual machine in the source address field with a physical network address of the first virtual machine. Step 145 includes replacing the logical network address of the second virtual machine in the destination address field with a physical network address of the second virtual machine. Step 146 includes replacing the first network packet integrity value in the network packet integrity field with a second network packet integrity value for the transformed outbound network packet, wherein the second network packet integrity value is determined using the cryptographic session key after replacing the logical network address of the first virtual machine in the source address field with a physical network address of the first virtual machine and replacing the logical network address of the second virtual machine in the destination address field with a physical network address of the second virtual machine. Step 147 ten includes the first hypervisor transmitting the transformed outbound network packet onto a network for delivery to the second virtual machine.

Figure 9:
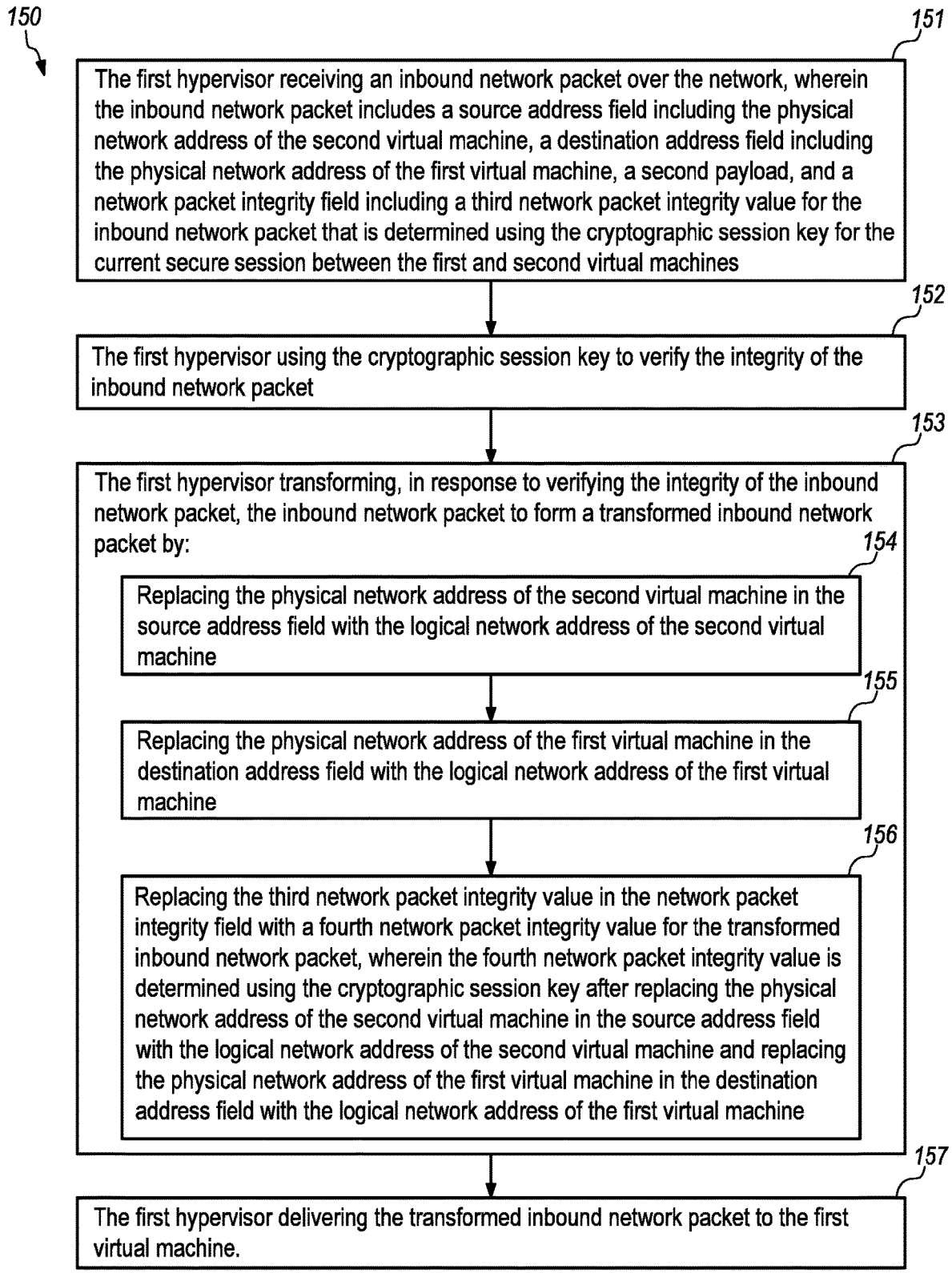
FIG. 9 is a flowchart of operations performed by a hypervisor that is hosting a virtual machine that is receiving a network packet.

FIG. 9 is a flowchart of a method 150 including steps or operations performed by a hypervisor that is hosting a virtual machine that is receiving a network packet. Step 151 includes the first hypervisor receiving an inbound network packet over the network, wherein the inbound network packet includes a source address field including the physical network address of the second virtual machine, a destination address field including the physical network address of the first virtual machine, a second payload, and a network packet integrity field including a third network packet integrity value for the inbound network packet that is determined using the cryptographic session key for the current secure session between the first and second virtual machines. Step 152 includes the first hypervisor using the cryptographic session key to validate the integrity of the inbound network packet Step 153 includes the first hypervisor transforming, in response to validating the integrity of the inbound network packet, the inbound network packet to form a transformed inbound network packet by means of steps 154, 155 and 156. Step 154 includes replacing the physical network address of the second virtual machine in the source address field with the logical network address of the second virtual machine. Step 155 includes replacing the physical network address of the first virtual machine in the destination address field with the logical network address of the first virtual machine. Step 156 includes replacing the third network packet integrity value in the network packet integrity field with a fourth network packet integrity value for the transformed inbound network packet, wherein the fourth network packet integrity value is determined using the cryptographic session key after replacing the physical network address of the second virtual machine in the source address field with the logical network address of the second virtual machine and replacing the physical network address of the first virtual machine in the destination address field with the logical network address of the first virtual machine. Step 157 includes the first hypervisor delivering the transformed inbound network packet to the first virtual machine.

Figure 10:
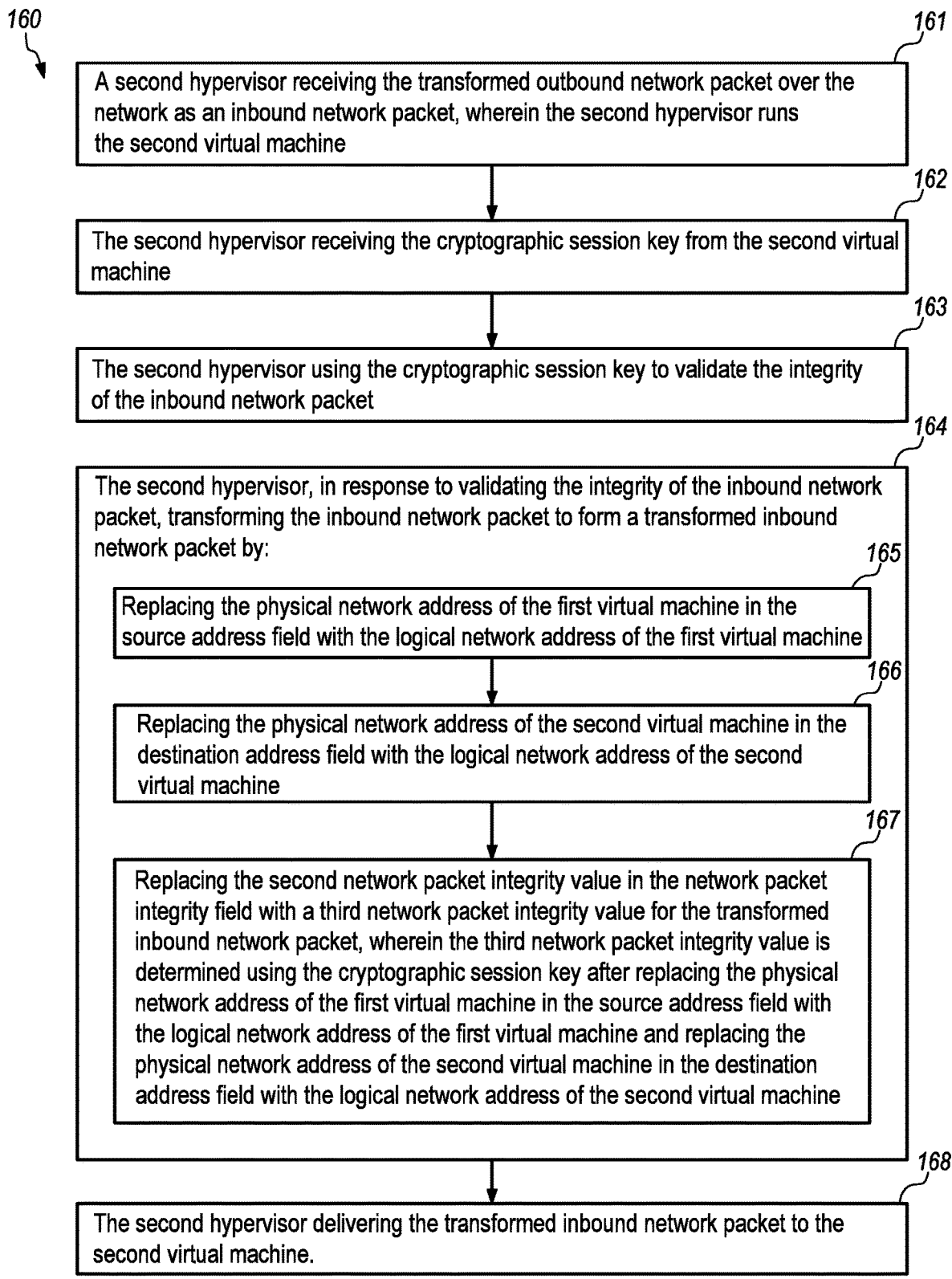
FIG. 10 is a flowchart of operations performed by a hypervisor that is hosting a virtual machine that is receiving a network packet from the first virtual machine.

FIG. 10 is a flowchart of a method 160 performed by a hypervisor that is hosting a virtual machine that is receiving a network packet from the first virtual machine. Step 161 includes a second hypervisor receiving the transformed outbound network packet over the network as an inbound network packet, wherein the second hypervisor runs the second virtual machine. Step 162 includes the second hypervisor receiving the cryptographic session key from the second virtual machine. Step 163 includes the second hypervisor using the cryptographic session key to validate the integrity of the inbound network packet.

Step 164 includes the second hypervisor, in response to validating the integrity of the inbound network packet, transforming the inbound network packet to form a transformed inbound network packet by means of steps 165, 166 and 167. Step 165 includes replacing the physical network address of the first virtual machine in the source address field with the logical network address of the first virtual machine. Step 166 includes replacing the physical network address of the second virtual machine in the destination address field with the logical network address of the second virtual machine. Step 167 includes replacing the second network packet integrity value in the network packet integrity field with a third network packet integrity value for the transformed inbound network packet, wherein the third network packet integrity value is determined using the cryptographic session key after replacing the physical network address of the first virtual machine in the source address field with the logical network address of the first virtual machine and replacing the physical network address of the second virtual machine in the destination address field with the logical network address of the second virtual machine Step 168 includes the second hypervisor delivering the transformed inbound network packet to the second virtual machine.

As will be appreciated by one skilled in the art, embodiments may take the form of a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. Furthermore, any program instruction or code that is embodied on such computer readable storage media (including forms referred to as volatile memory) that is not a transitory signal are, for the avoidance of doubt, considered "non-transitory".

Program code embodied on a computer readable storage medium may be transmitted using any appropriate medium, including but not limited to wireless, wireline, optical fiber cable, RF, etc., or any suitable combination of the foregoing. Computer program code for carrying out various operations may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments may be described with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored on computer readable storage media is not a transitory signal, such that the program instructions can direct a computer, other programmable data processing apparatus, or other devices to function in a particular manner, and such that the program instructions stored in the computer readable storage medium produce an article of manufacture.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to limit the scope of the claims. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the embodiment.

The corresponding structures, materials, acts, and equivalents of all means or steps plus function elements in the claims below are intended to include any structure, material, or act for performing the function in combination with other claimed elements as specifically claimed. Embodiments have been presented for purposes of illustration and description, but it is not intended to be exhaustive or limited to the embodiments in the form disclosed. Many modifications and variations will be apparent to those of ordinary skill in the art after reading this disclosure. The disclosed embodiments were chosen and described as non-limiting examples to enable others of ordinary skill in the art to understand these embodiments and other embodiments involving modifications suited to a particular implementation.

What is claimed is:

1. A computer program product comprising a non-volatile computer readable medium and non-transitory program instructions embodied therein, the program instructions being configured to be executable by a processor to cause the processor to perform operations comprising:

receiving an outbound network packet from a first virtual machine to a second virtual machine, wherein the outbound network packet includes a source address field including a logical network address of the first virtual machine, a destination address field including a logical network address of the second virtual machine, a first payload, and a network packet integrity field including a first network packet integrity value for the outbound network packet that is determined using a cryptographic session key for a current secure session between the first and second virtual machines;

receiving the cryptographic session key from the first virtual machine;

transforming the outbound network packet received from the first virtual machine to form a transformed outbound network packet by:

replacing the logical network address of the first virtual machine in the source address field with a physical network address of the first virtual machine;

replacing the logical network address of the second virtual machine in the destination address field with a physical network address of the second virtual machine; and replacing the first network packet integrity value in the network packet integrity field with a second network packet integrity value for the transformed outbound network packet, wherein the second network packet integrity value is determined using the cryptographic session key after replacing the logical network address of the first virtual machine in the source address field with a physical network address of the first virtual machine and replacing the logical network address of the second virtual machine in the destination address field with a physical network address of the second virtual machine; and transmitting the transformed outbound network packet onto a network for delivery to the second virtual machine.

2. The computer program product of claim 1, wherein the first payload included in the outbound network packet includes data encrypted with the cryptographic session key for a current secure session between the first and second virtual machines.

3. The computer program product of claim 1, the operations further comprising:

receiving an inbound network packet over the network, wherein the inbound network packet includes a source address field including the physical network address of the second virtual machine, a destination address field including the physical network address of the first virtual machine, a second payload, and a network packet integrity field including a third network packet integrity value for the inbound network packet that is determined using the cryptographic session key for the current secure session between the first and second virtual machines;

using the cryptographic session key to validate the integrity of the inbound network packet;

transforming, in response to validating the integrity of the inbound network packet, the inbound network packet to form a transformed inbound network packet by:

replacing the physical network address of the second virtual machine in the source address field with the logical network address of the second virtual machine;

replacing the physical network address of the first virtual machine in the destination address field with the logical network address of the first virtual machine; and replacing the third network packet integrity value in the network packet integrity field with a fourth network packet integrity value for the transformed inbound network packet, wherein the fourth network packet integrity value is determined using the cryptographic session key after replacing the physical network address of the second virtual machine in the source address field with the logical network address of the second virtual machine and replacing the physical network address of the first virtual machine in the destination address field with the logical network address of the first virtual machine; and delivering the transformed inbound network packet to the first virtual machine.

4. The computer program product of claim 1, further comprising:

accessing a location table that includes a first location record associating the logical network address of the first virtual machine with the current physical network address of the first virtual machine, and a second location record associating the logical network address of the second virtual machine with the current physical network address of the second virtual machine.

5. A method, comprising:

a first hypervisor receiving an outbound network packet from a first virtual machine to a second virtual machine, wherein the first virtual machine runs on the first hypervisor, and wherein the outbound network packet includes a source address field including a logical network address of the first virtual machine, a destination address field including a logical network address of the second virtual machine, a first payload, and a network packet integrity field including a first network packet integrity value for the outbound network packet that is determined using a cryptographic session key for a current secure session between the first and second virtual machines;

the first hypervisor receiving the cryptographic session key from the first virtual machine;

the first hypervisor transforming the outbound network packet received from the first virtual machine to form a transformed outbound network packet by:

replacing the logical network address of the first virtual machine in the source address field with a physical network address of the first virtual machine;

replacing the logical network address of the second virtual machine in the destination address field with a physical network address of the second virtual machine; and replacing the first network packet integrity value in the network packet integrity field with a second network packet integrity value for the transformed outbound network packet, wherein the second network packet integrity value is determined using the cryptographic session key after replacing the logical network address of the first virtual machine in the source address field with a physical network address of the first virtual machine and replacing the logical network address of the second virtual machine in the destination address field with a physical network address of the second virtual machine; and the first hypervisor transmitting the transformed outbound network packet onto a network for delivery to the second virtual machine.

6. The method of claim 5, wherein the first payload included in the outbound network packet includes data encrypted by the first virtual machine using the cryptographic session key for the current secure session between the first and second virtual machines.

7. The method of claim 5, further comprising:

the first hypervisor receiving an inbound network packet over the network, wherein the inbound network packet includes a source address field including the physical network address of the second virtual machine, a destination address field including the physical network address of the first virtual machine, a second payload, and a network packet integrity field including a third network packet integrity value for the inbound network packet that is determined using the cryptographic session key for the current secure session between the first and second virtual machines;

the first hypervisor using the cryptographic session key to validate the integrity of the inbound network packet;

the first hypervisor transforming, in response to validating the integrity of the inbound network packet, the inbound network packet to form a transformed inbound network packet by:

replacing the physical network address of the second virtual machine in the source address field with the logical network address of the second virtual machine;

replacing the physical network address of the first virtual machine in the destination address field with the logical network address of the first virtual machine; and replacing the third network packet integrity value in the network packet integrity field with a fourth network packet integrity value for the transformed inbound network packet, wherein the fourth network packet integrity value is determined using the cryptographic session key after replacing the physical network address of the second virtual machine in the source address field with the logical network address of the second virtual machine and replacing the physical network address of the first virtual machine in the destination address field with the logical network address of the first virtual machine; and the first hypervisor delivering the transformed inbound network packet to the first virtual machine.

8. The method of claim 7, further comprising:
the first virtual machine using the cryptographic session key to validate the integrity of the transformed inbound network packet; and
the first virtual machine, in response to validating the integrity of the transformed inbound network packet, processing the second payload.

9. The method of claim 8, wherein the second payload includes data encrypted with the cryptographic session key for the current secure session between the first and second virtual machines, and wherein processing the second payload includes decrypting the data in the second payload using the cryptographic session key.

10. The method of claim 5, further comprising:
accessing a location table that includes a first location record associating the logical network address of the first virtual machine with the current physical network address of the first virtual machine, and a second location record associating the logical network address of the second virtual machine with the current physical network address of the second virtual machine.

11. The method of claim 10, further comprising:
updating the location table in response to migration of the first virtual machine or the second virtual machine to a different physical network address.

12. The method of claim 5, further comprising:
the first virtual machine negotiating the cryptographic session key with the second virtual machine for use during the cryptographic session between the first and second virtual machines; and
the first virtual machine generating the outbound network packet and providing the outbound network packet to the first hypervisor.

13. The method of claim 12, wherein the cryptographic session key is negotiated using a secure network protocol selected from Internet Protocol Security and Media Access Control Security.

14. The method of claim 5, further comprising:
a second hypervisor receiving the transformed outbound network packet over the network as an inbound network packet, wherein the second hypervisor runs the second virtual machine;
the second hypervisor receiving the cryptographic session key from the second virtual machine;
the second hypervisor using the cryptographic session key to validate the integrity of the inbound network packet;
the second hypervisor, in response to validating the integrity of the inbound network packet, transforming the inbound network packet to form a transformed inbound network packet by:
replacing the physical network address of the first virtual machine in the source address field with the logical network address of the first virtual machine;
replacing the physical network address of the second virtual machine in the destination address field with the logical network address of the second virtual machine; and
replacing the second network packet integrity value in the network packet integrity field with a third network packet integrity value for the transformed inbound network packet, wherein the third network packet integrity value is determined using the cryptographic session key after replacing the physical network address of the first virtual machine in the source address field with the logical network address of the first virtual machine and replacing the physical network address of the second virtual machine in the destination address field with the logical network address of the second virtual machine; and
the second hypervisor delivering the transformed inbound network packet to the second virtual machine.

15. The method of claim 14, further comprising:
the second virtual machine using the cryptographic session key to validate the integrity of the transformed inbound network packet; and
the second virtual machine, in response to validating the integrity of the transformed inbound network packet, using the cryptographic session key to decrypt the payload.

16. The method of claim 14, further comprising:
the second hypervisor accessing a location table that includes a first location record associating the logical network address of the first virtual machine with the current physical network address of the first virtual machine, and a second location record associating the logical network address of the second virtual machine with the current physical network address of the second virtual machine.

17. The method of claim 5, wherein the first virtual machine is a guest machine of a first host computer and the second virtual machine is a guest machine of a second host computer.

18. The method of claim 5, further comprising:
the first virtual machine installing a key agreement protocol and a guest-agent on the first virtual machine, wherein the key agreement protocol provides the cryptographic session key to the guest-agent, and wherein the guest-agent provides the cryptographic session key to the first hypervisor.

19. The method of claim 18, further comprising:
the guest-agent authenticating the first hypervisor before providing the cryptographic session key to the first hypervisor.

* * * * *